United States Patent [19]

Hirano et al.

[11] Patent Number: 5,761,547
[45] Date of Patent: Jun. 2, 1998

[54] OPTICAL SYSTEM WITH MULTIPLE PROCESSORS

[75] Inventors: Shinichi Hirano, Tokyo; Nobuhiko Terui, Ichikawa, both of Japan

[73] Assignee: Nikon Corporation, Tokyo, Japan

[21] Appl. No.: 889,941

[22] Filed: Jul. 10, 1997

Related U.S. Application Data

[63] Continuation of Ser. No. 734,961, Oct. 22, 1996, abandoned, which is a continuation of Ser. No. 352,878, Dec. 9, 1994, abandoned.

[30] Foreign Application Priority Data

Dec. 10, 1993 [JP] Japan ................................. 5-341586
Dec. 10, 1993 [JP] Japan ................................. 5-341587

[51] Int. Cl.$^6$ ............................. G03B 5/00; G03B 13/36
[52] U.S. Cl. ........................... 396/55; 396/89; 396/303
[58] Field of Search .......................... 396/52–55, 48, 396/89, 303; 348/208, 345

[56] References Cited

U.S. PATENT DOCUMENTS

| | | | |
|---|---|---|---|
| 4,965,619 | 10/1990 | Shikaumi et al. | 354/430 |
| 5,101,230 | 3/1992 | Shikaumi et al. | 354/430 |
| 5,266,981 | 11/1993 | Hamada et al. | 354/400 |
| 5,335,032 | 8/1994 | Onuki et al. | 354/400 X |

*Primary Examiner*—W. B. Perkey

[57] ABSTRACT

An optical control system which uses multiple processors to simultaneously perform an autofocus function and an antivibration function. The optical control system is specifically usable in a camera lens having an optical system and which depends from a camera body having a main control unit. The optical control system, housed in the lens, is provided with a microcomputer for communication with the main control unit in the camera body, an antideflection control microcomputer, which moves the optical system so as to compensate for vibrations in the lens, and a microcomputer for ultrasonic motor drive control, which performs an autofocus function by moving the optical system with an ultrasonic motor so as to obtain a desired focus. Instructions from the main control unit in the camera body are received by the microcomputer for communication and directed, based on content, to either the antideflection control microcomputer or the microcomputer for ultrasonic motor control. In this manner, the main control unit in the camera body is freed from having to maintain two channels of communication and the microcomputers in the camera lens can operate in parallel, thus increasing the speed of processing allowing for higher quality photographs to be produced by the optical system. Further, the microcomputer for communication, based on the signals from the main control unit in the camera body, can instruct a power supply to selectively supply power to the antideflection control microcomputer and the microcomputer for ultrasonic motor control to reduce the power consumption of the lens.

26 Claims, 6 Drawing Sheets

OPTICAL SYSTEM WITH MULTIPLE PROCESSORS

This application is a continuation of application Ser. No. 08/734,961, filed Oct. 22, 1996, now abandoned, which is a continuation of application Ser. No. 08/352,878, filed Dec. 9, 1994, now abandoned.

BACKGROUND OF THE INVENTION

1. Field of the Invention

The present invention relates to an optical control system having an autofocus (AF) unit and an anti-vibration unit, and, more specifically, to a camera lens equipped with multiple processors to process data related to the AF unit and the anti-vibration unit.

2. Description of the Related Art

Optical control systems having AF units, which move an optical lens along an optical axis to change the focus of a camera lens, and antideflection units (i.e. anti-vibration units) which detect the angular change of an optical axis in a camera lens due to hand shaking and the like, are known. Japanese Patent Publication JP-A-2-66535 and Japanese Patent Publication JP-A-2-183217, show examples of image correction by shifting of a portion of a photographic optical system in an internal focusing telephoto lens.

In these known devices, a CPU in the camera body generates control signals based on information from a deflection detection unit and a focus detection unit in the camera body, and on optical system position information received from an encoder within the camera lens. These control signals are transmitted to a CPU in the camera lens which controls an antideflection drive unit and a focus drive unit. However, in these known devices, when the control of the antideflection drive unit and the focus drive unit is performed by the CPU in the lens, the substantial processing time required adversely affects the flow of information being transmitted between the camera body CPU and the lens CPU. This, in turn, adversely affects the control and operation of other units, for example, the deflection detection unit, focus detection unit, antideflection drive unit, and the focus drive unit. The result is that the various functions cannot be performed accurately at the high speeds required to produce high quality photographs.

One method proposed to solve this problem is to provide a plurality of control units, for example CPUs, in the camera lens to individually control the deflection correction drive unit and the focus drive unit. However, if information regarding optical system position, absolute distance, and the like, are transmitted to one CPU in the camera lens, information must still be transmitted to each of the other CPUs in the camera lens, increasing the processing time in the CPU which is responsible for such communication.

SUMMARY OF THE INVENTION

Accordingly, it is an object of the present invention to provide an optical control system which can control a deflection correction drive unit and a focus drive unit accurately at high speed.

It is another object of the present invention to provide a lens capable of parallel processing using a separate communication unit such that the antideflection drive unit and the focus drive unit can be rapidly operated.

It is yet another object of the present invention to provide an optical control system wherein position information is simultaneously transmitted to the communication unit, the antideflection unit and the autofocus unit, such that communication time is shortened and high speed control is possible.

It is yet another object of the present invention to provide a photographic device capable of performing an antideflection function and an autofocus function, in parallel and at high speeds with great accuracy, while conserving electric power consumption.

Objects of the present invention are achieved by an optical control system responsive to a main control unit for adjusting an optical system, the optical system comprising an antideflection unit to compensate for vibrations in the optical system, an autofocus unit to adjust the focus of the optical system, and a communication unit to interface with the main control unit and to selectively transmit instructions from the main control unit to at least of said antideflection unit and said autofocus unit.

Yet another object of the present invention is achieved by a camera comprising a camera body having a main control unit, and a lens, dependent from said camera body, having an optical system, an antideflection unit to compensate for vibrations in the optical system, an autofocus unit to adjust the focus of the optical system, and a communication system to interface with the main control unit and to transmit information to the antideflection unit and the autofocus unit.

Objects of the present invention are further achieved by a lens for a camera having a main control unit, the lens comprising a communication unit to interface with the main control unit, an optical system, an optical system position detection unit to output a signal indicating the position of the optical system, an antideflection unit including an antideflection control unit responsive to the communication unit to output a signal indicating a first desired position that the optical system must move to in order to compensate for vibration, the antideflection control unit signal being based on the signal from the optical system position detection unit, an antideflection drive unit to move the optical system to the first desired position in response to the signal from the antideflection control unit, and a deflection detection unit to output a signal indicative of deflection in the optical system caused by vibrations, a focus control unit including a focus control unit responsive to the communication unit to output a signal indicating a second desired position that the optical system must move to in order to obtain a desired focus position, the focus control unit signal being based on the signal from the optical system position detection unit, a focus drive unit to move the optical system to the second desired position in response to the signal from the focus control unit, and a focus detection unit to output a signal to the focus control unit indicating a focus state of the optical system, and a power supply to selectively supply power to the antideflection unit and the focus control unit.

Objects of the present invention are also achieved in a photographic device comprising a body and a lens having an optical system, a deflection detection unit to detect deflection of an optical axis of the optical system, an antideflection drive unit to cause a relative shift between a portion or the whole of the optical system and a picture plane, and an antideflection control unit forming a control signal for the antideflection drive unit based on the output of a deflection detection unit, a focus detection unit to detect the state of focus of the optical system, a focus unit, to move a portion or the whole of the optical system in the direction of the optical axis, a focus control unit forming a control signal for the focus drive unit based on the output of the focus detection unit, and an optical system position detector, to detect the position of the optical system, a communication unit adapted to communicate with the body, a main control unit for controlling the antideflection drive control unit, based on control signals from the antideflection control unit transmitted via the communication unit, and on position information transmitted from the optical system position detector, the main control unit controlling the focus drive unit based on control signals from the focus control unit transmitted via the communication unit and on position information transmitted from the optical system position detector.

Objects of the present invention are also achieved in a photographic device wherein an optical system position detector simultaneously transmits position information to a communication control unit, an antideflection unit, and an autofocus unit.

Objects of the present invention may also be achieved by providing a photographic device having a body and a lens, the lens having an optical system, a deflection detection unit to detect deflection of an optical axis of the optical system, an antideflection drive unit to relatively shift a portion of the optical system with respect to a picture plane, an antideflection control unit to output a signal to control the antideflection drive unit, a focus detection unit to detect the state of focus of the optical system, a focus drive unit to move a portion of the optical system along the optical axis, a focus control unit to control the focus drive unit based on the output of the focus detection unit, an optical system position detection unit to output a signal indicative of the position of the optical system, a communication unit to perform communication with the body, a main control unit for controlling the antideflection control unit based on control signals from the antideflection control unit transmitted via the communication unit, and the signal from the optical system position detection unit, the main control unit controlling the focus control unit based on control signals from the focus control unit transmitted via the communication unit, and on the signal from the optical system position detection unit, and an electric supply unit to supply electric power to the communication unit, the antideflection unit, and the autofocus control unit, the electric supply unit supplying power only to those units which are in use.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments to the present invention, examples of which are illustrated in the accompanying drawings.

Figure 1:
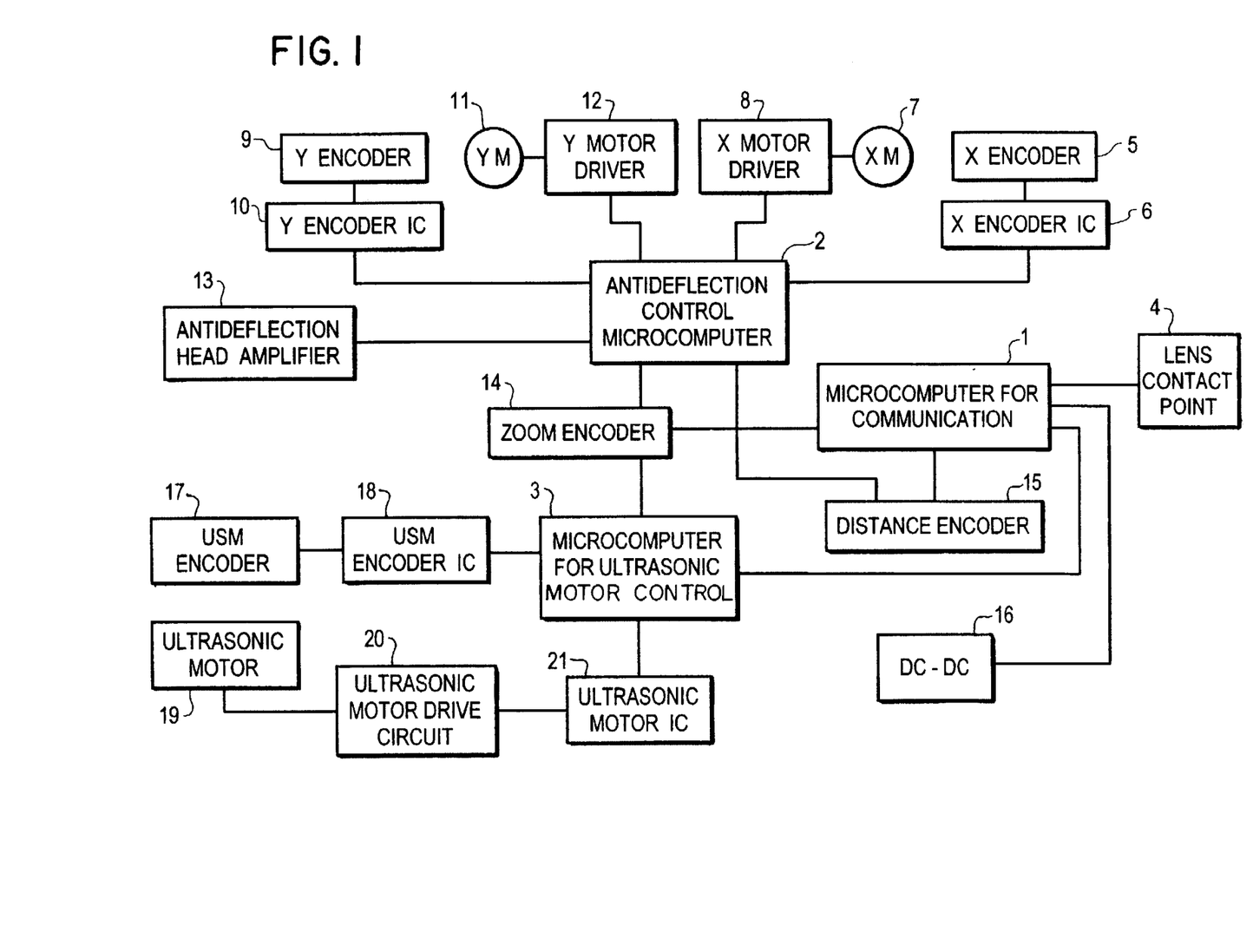
FIG. 1 is a block diagram of an optical control system in accordance with a first embodiment of the present invention.

FIG. 1 is a block diagram showing an optical control system according to the first preferred embodiment of the present invention. As shown in FIG. 1 the optical control system is for use in a photographic device, and more specifically, in a camera lens for attachment to a camera body.

The optical control system, according to the first preferred embodiment of the present invention, is equipped with a microcomputer for communication 1, an antideflection control microcomputer 2 which serves as an antideflection control unit for an antideflection unit, and a microcomputer for ultrasonic motor control 3 which serves as a focus control unit for an autofocus unit. The microcomputer for communication 1 performs communication with the camera body and transmits instructions to the antideflection control microcomputer 2 and the microcomputer for ultrasonic motor control 3. The antideflection control microcomputer 2, controls the drive of an antideflection drive unit comprising an X axis drive motor 7 ("XM"), an X axis motor driver 8, a Y axis drive motor 1 ("YM"), and a Y axis motor driver 12. The microcomputer for ultrasonic motor control 3 controls the ultrasonic motor 19 to drive an optical system (not shown) in the camera lens. A lens contact point 4, connected to the microcomputer for communication 1, is comprised of a group of electrical contact points for delivery and receipt of signals to and from the camera body.

The antideflection unit has an X encoder 5 which outputs a signal indicative of the amount of motion of the optical system in the X axis direction to an X encoder IC 6. The X encoder IC 6 converts the signal from the X encoder 5 into electrical signals usable by the antideflection control microcomputer 2. An X axis motor 7 drives the optical system on the X axis in response to signals from an X axis motor driver 8. Similarly, the Y encoder 9 detects the amount of motion of the optical system in the Y axis direction and outputs a signal to the Y encoder IC 10. The Y encoder IC 10 converts the signal from the Y encoder 9 into electrical signals, usable by the antideflection control microcomputer 2. The Y axis drive motor 11 drives the optical system on the Y axis in response to signals from the Y axis motor driver 12. In this preferred embodiment, the signals from the X encoder IC 6 and the Y encoder IC 10 use pulses to indicate movement of the optical system. The antideflection control microcomputer 2 transmits control signals to the X axis motor driver 8 and the Y axis motor driver 12 to indicate how to move the optical system. The antideflection unit is controlled based on the output of an antideflection master control unit (not shown) in the camera body and on optical system position information output by the X encoder IC 6 and the Y encoder IC 10. An antideflection head amplifier 13, serving as a deflection detection unit for the antideflection unit, detects the amount of deflection of the optical axis of the optical system and outputs an analog signal indicative of image blur to the antideflection control microcomputer 2.

The autofocus unit, as described for the first embodiment of the present invention, uses an ultrasonic motor 19 ("USM") to move the optical system along the optical axis to obtain focus. A USM encoder 17 detects the amount of movement of the ultrasonic motor 19. The USM encoder 17 is Connected to a USM encoder IC 18 which converts the amount of movement of the ultrasonic motor 19 into an electrical signal. In this preferred embodiment, a pulse is transmitted for each unit the optical system moves. The signal from the USM encoder 17 is transmitted to the microcomputer for ultrasonic motor control 3. An ultrasonic motor drive circuit 20 connected to the ultrasonic motor 19, has the characteristic drive frequency of the ultrasonic motor 19, and generates two drive signals having a mutual phase difference of 90°. The ultrasonic motor IC 21 serves as an interface between the microcomputer for ultrasonic motor control 3 and the ultrasonic motor drive circuit 20.

A zoom encoder 14 detects the position of the optical system, converts it into an electrical signal, and outputs the electrical signal to the microcomputer for communication 1, the antideflection control microcomputer 2, and the microcomputer for ultrasonic motor control 3. Similarly, a distance encoder 15 detects the range of an object being photographed and outputs an electrical signal to the microcomputer for communication 1 and the antideflection control microcomputer 2.

A DC-DC converter 16 supplies a DC voltage, stabilized against changes of the battery voltage to the microcomputer for communication 1.

Figure 2:
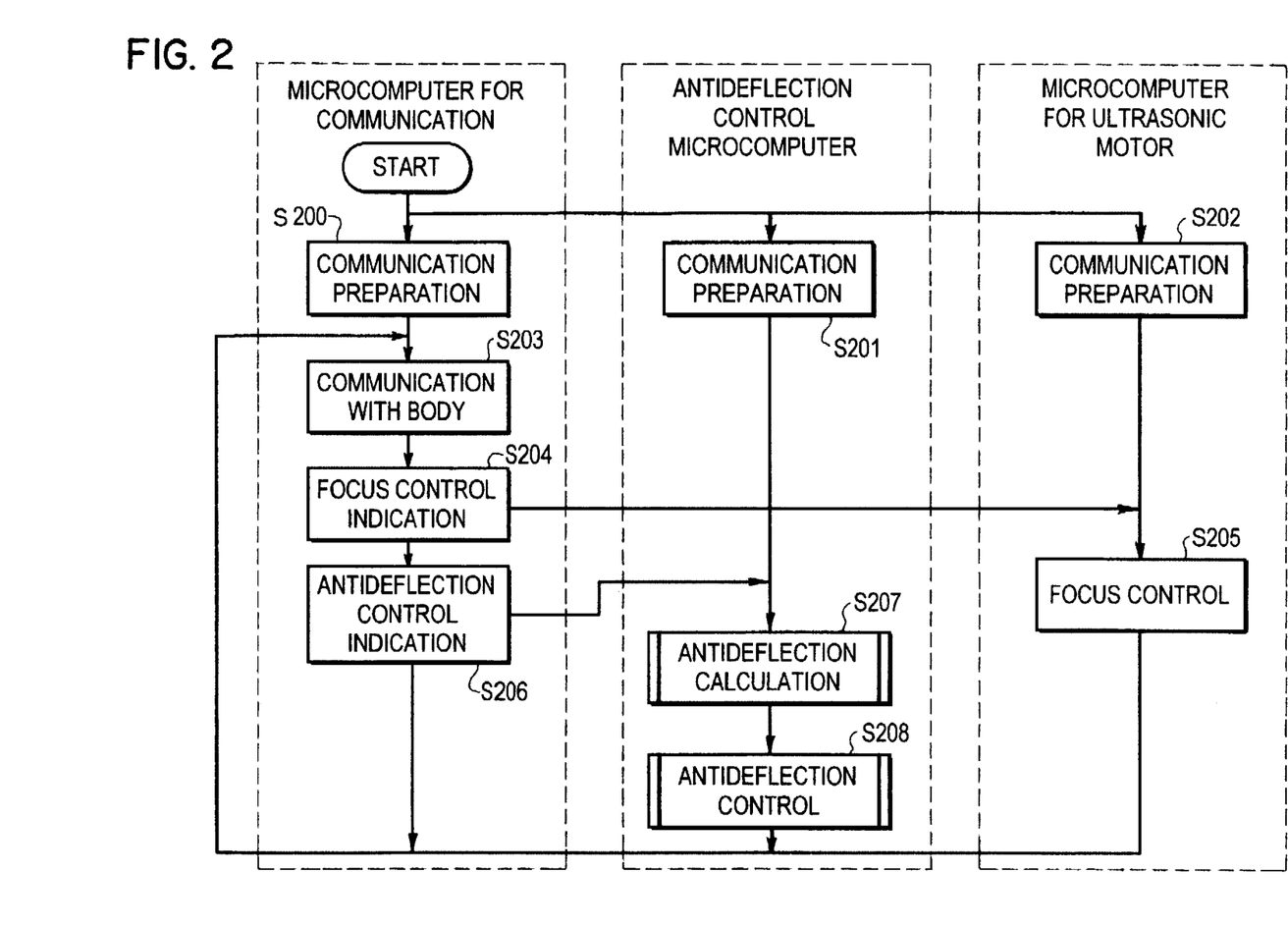
FIG. 2 is a flow chart showing the operation of an optical control system in accordance with the first embodiment of the present invention.

FIG. 2 is a flow chart showing the operational sequence of events of the microcomputer for communication 1, the antideflection control microcomputer 2, and the microcomputer for ultrasonic motor control 3, used in the optical control system according to the first preferred embodiment of the present invention.

In step S200, the microcomputer for communication 1 prepares for communication. Simultaneously, the antideflection control microcomputer 2 prepares for communication in step S201, and the microcomputer for ultrasonic motor control prepares for communication in step S202.

Thereafter, in step S203, the microcomputer for communication 1 communicates with the camera body via the contact point 4.

In step S204, the microcomputer for communication 1 receives instruction from the camera body and transmits focus control instructions to the microcomputer for ultrasonic motor control 3.

In step S205, the microcomputer for ultrasonic motor control 3 performs focus control based on information from the zoom encoder 14 and the distance encoder 15.

In step S206, the microcomputer for communication 1 receives instructions from the camera body and transmits antideflection control instructions to the antideflection control microcomputer 2.

In step S207, the antideflection control microcomputer 2 performs antideflection calculations, as set forth with reference to FIG. 3, describer hereinafter.

In step S208, the antideflection control microcomputer 2 performs antideflection control, as set forth with reference to FIG. 4, describer hereinafter.

Figure 3:
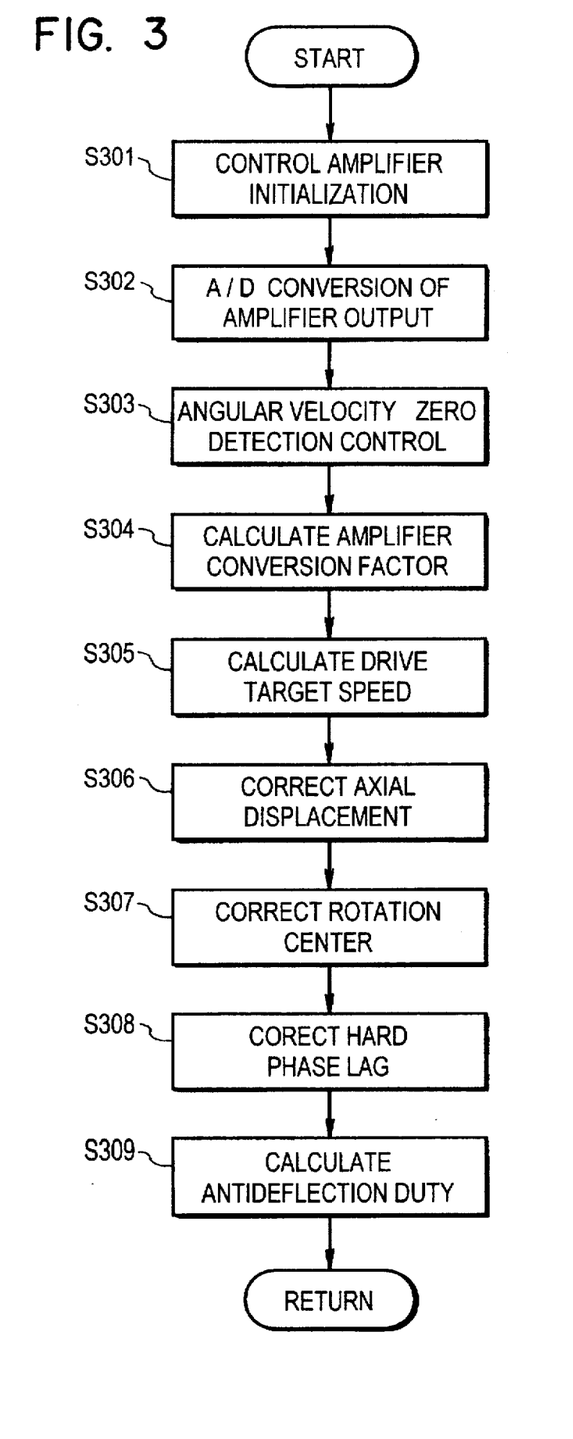
FIG. 3 is a flow chart showing antideflection calculation in the optical control system of the first embodiment.

FIG. 3 is a flow chart showing the sequence for performing antideflection calculations for the photographic device in accordance with the first embodiment of the present invention.

In step S301, the antideflection head amplifier 13 is initialized.

In step S302, the analog signal output of the antideflection head amplifier 13 is converted into digital information.

In step S303, the level corresponding to a zero angular velocity is detected from the digital information created in step S302.

In step S304, an amplifier conversion factor is calculated to convert the output voltage from the antideflection head amplifier 13 into an indication of control speed.

In step S305, control speeds for the X axis drive motor 7 and the Y axis drive motor 11 are calculated using the results obtained in steps S303 and S304.

In step S306, the results calculated in step S305 are corrected, with respect to the control speed, for the displacement amount error of the X-axis and Y-axis establishment angle and 90°.

In step S307 the motor control speed is corrected using hand tremor rotation center position information obtained from the zoom encoder 14, the distance encoder 15 and the results obtained in S306.

In step S308, a phase lag correction calculation is performed for the results obtained in step S307 to account for the signal path length from the antideflection control microcomputer 2 to the antideflection head amplifier 13.

In step S309, a PWM, i.e. pulse width modification, duty of the X motor driver 8 and of the Y motor driver 12 are calculated using the information from the zoom encoder 14, the distance encoder 15, and the results calculated in S308.

Figure 4:
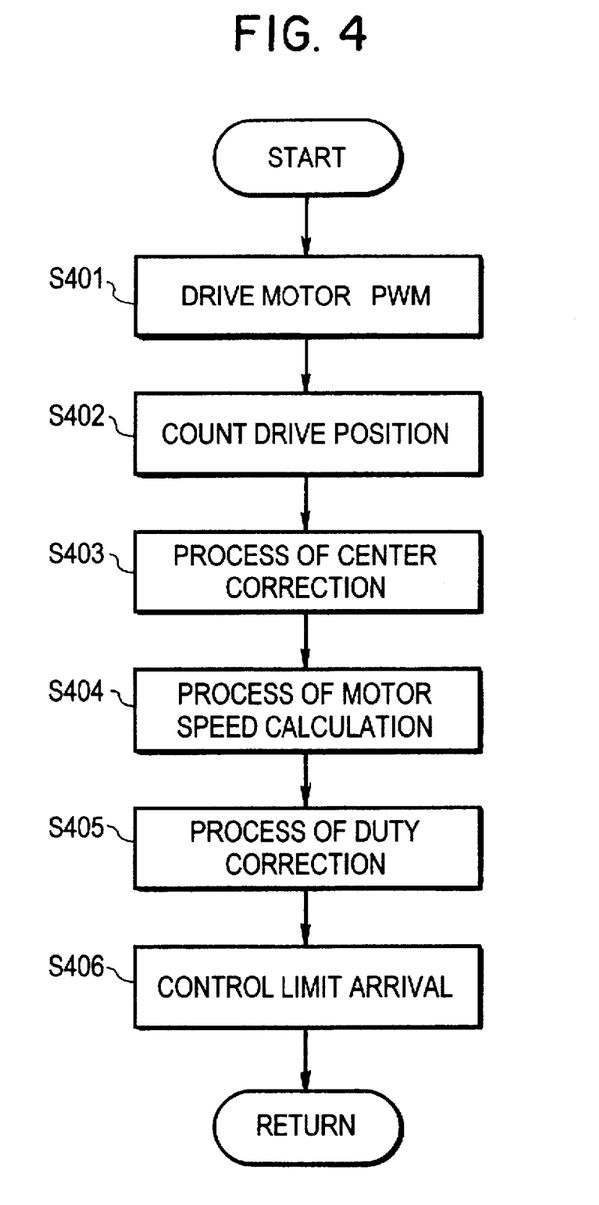
FIG. 4 is a flow chart showing antideflection control in the optical control system in accordance with the first embodiment of the present invention.

FIG. 4 is a flow chart showing the operational sequence for performing antideflection control of the optical system according to the first preferred embodiment of the present invention.

In step S401, a PWM duty signal is generated for the X motor driver 8 and for the Y motor driver 12 by the antideflection control microcomputer 2 based on the result of step S309.

In step S402, the pulses output from the X encoder 5 and the Y encoder 9 are counted, by the microcomputer 2 for antideflection control 2, to obtain position information for the optical system.

In step S403, the optical system is moved to a center position, based on a correction value equal to the difference between the count value obtained in step S402 and the lens center position.

In step S404, a control speed is calculated from the count value obtained in step S402.

In step S405, a control PWM duty correction computation is performed based on the control speed calculated in step S404.

In step S406, limit arrival control is performed if the optical system has reached a control limit position, i.e. a position which limits the range of movement of the optical system.

In this manner, the functions of communication, antideflection control, and ultrasonic motor use for AF are independently controlled.

In accordance with the preferred embodiment, the camera body, using plural microcomputer, performs film advance control, mirror drive control, strobe control, AF control, and external display control. The control of related functions in the camera body, with the exception of AF control and strobe control, leaves a sufficient time margin for control of lens related functions after the end of an exposure or with respect to the commencement of exposure. Moreover, with respect to strobe control during exposure, the microcomputers in the camera body do not directly participate, allowing further time for control of lens related functions. In the preferred embodiments, AF control occurs directly before exposure (i.e. after depression of a shutter release button, and up to opening of a shutter), while antideflection control starts prior to exposure and continues through exposure. In either case, the time allowed for control is very short, and because the accuracy of this control directly affects the resultant image, the required degree of accuracy is very high in comparison with other control functions. Control by plural microcomputers in the camera lens, as set forth in the first preferred embodiment, facilitates effective control within strict time limitations.

Although the first embodiment of the present invention has been described with respect to a particular configuration for the optical control system, it will be recognized that the first embodiment is not limited to the particular configuration, and modifications and changes are possible. For example, while the Y encoder 9 and the X encoder 5 have been described as outputting pulses indicative of the movement of an optical lens, it will be recognized that other signals may be used to indicate movement of the lens, for example, increasing or decreasing the voltage or current of a signal in relationship to the position of the lens. Further, while the AF function has been described with respect toward using an ultrasonic motor 19 for moving the focusing lens along an optical axis, it will be recognized that other types of motors are usable.

Figure 5:
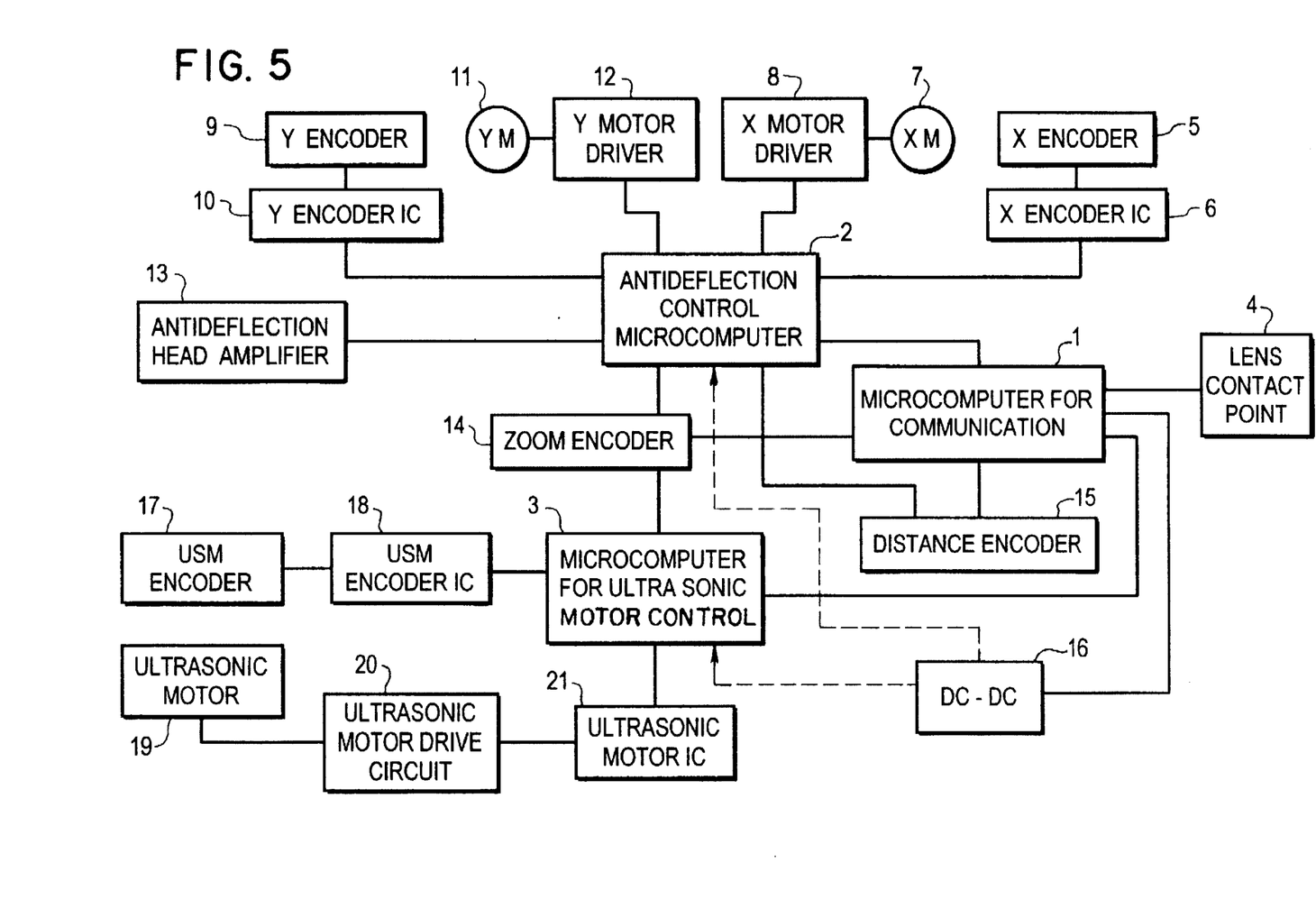
FIG. 5 is a block diagram of an optical control system in accordance with a second embodiment to the present invention.

FIG. 5 is block diagram showing a second preferred embodiment of an optical control system for use in a photographic device according to the present invention. According to the second preferred embodiment, the DC-DC converter 16 provides an electrical supply not only to the microcomputer for communication 1, but also to the antideflection control microcomputer 2 and to the microcomputer for ultrasonic motor control 3. Further, the microcomputer for communication 1 also receives an electrical supply from the camera body (not shown) via lens contact point 4. Using this configuration, the DC-DC converter 16 can selectively supply power to each of the three microcomputers 1, 2, and 3, only when the microcomputers are in use, thereby reducing electric power consumption. Selective control of the DC-DC converter 16 is preferably achieved by the microcomputer for communication 1.

Figure 6:
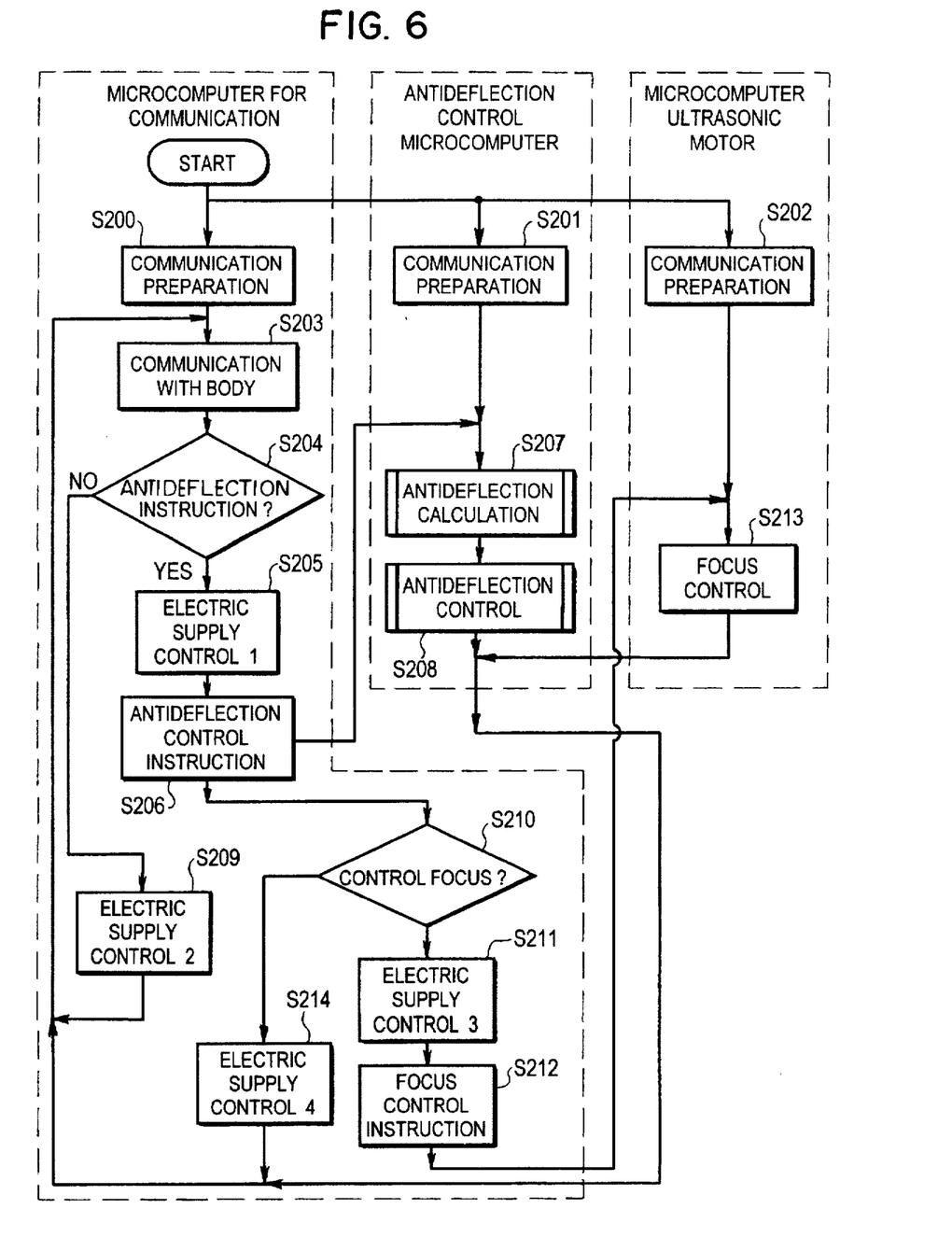
FIG. 6 is a flow chart showing the operation of an optical control system in accordance with a second embodiment of the present invention.

FIG. 6 is a flow chart of the operation of the photographic device in accordance with the second preferred embodiment of the present invention. In steps S200, S201, S202 the microcomputer for communication 1, the antideflection control microcomputer 2 and the microcomputer for ultrasonic motor control 3, respectively, are simultaneously prepared for communication. Thereafter, in step S203 the microcomputer for communication 1 communicates with the camera body to obtain instructions.

In step S204, the instructions from the camera body are tested and if antideflection control is required, flow proceeds to step S205. If antideflection control is required, flow proceeds to step S209.

In step S205, the microcomputer for communication 1 instructs the DC-DC converter 6 to supply electric power to the antideflection control microcomputer 2. Thereafter, in step S206, the microcomputer for communication 1 transmits antideflection control instructions, received from the camera body, to the antideflection control microcomputer 2. In steps S207 and steps S208 antideflection calculation and antideflection control as described in the first embodiment, with respect to FIGS. 3 and 4, is performed. In step S209, the microcomputer for communication 1 instructs the DC-DC converter 16 to shut down electric supply for the antideflection control microcomputer.

After the microcomputer for communication has instructed the antideflection control microcomputer 2 to perform antideflection control, flow proceeds to step S210. In step S210, the instructions from the camera body are tested to determine whether focus control is necessary. If focus control is necessary, flow proceeds to step S211; if, on the other hand, no focus control is necessary, flow proceeds to S214.

In step S211, the microcomputer for communication 1 instructs the DC-DC converter to supply electric power to the microcomputer for ultrasonic control 3. Thereafter, in step S212 the microcomputer for communication 1 transmits focus control instructions, received from the camera body, to the microcomputer for ultrasonic motor control 3. Focus control is carried out by the microcomputer for ultrasonic motor control in step S213.

In step S214, the microcomputer for communication 1 instructs the DC-DC converter 16 to shut down the electric power supply to the microcomputer for ultrasonic motor control 3.

In the photographic device, as set forth in the second preferred embodiment, electric current is only supplied to those sub-systems which are in use, thereby diminishing the power requirements of the photographic device. However, parallel operation of the various sub-systems is still possible, allowing increased speed and accuracy in the antideflection and autofocus functions as set forth in the first preferred embodiment of the present invention.

Although the second embodiment of the present invention has been described with respect to a particular configuration for the optical control system, it will be recognized that the second embodiment is not limited to the particular configuration and modifications and changes are possible. For example, while the DC-DC converter has been described with respect to receiving instructions from the microcomputer for communication 1, it will be recognized that such instructions could be transmitted directly from the camera body.

Although few preferred embodiments of the present inventions have been shown and described, it would be appreciated by those skilled in the art that changes may be made in these embodiments without departing from the principles and spirit of the invention, the scope of which is defined in the claims and their equivalents.

What is claimed is:

1. An optical control system responsive to a main control unit for adjusting an optical system, the optical control system comprising:
   an antideflection unit to compensate for vibrations in the optical system;
   an autofocus unit to adjust the focus of the optical system;
   a communication unit to interface with the main control unit and to selectively transmit instructions from the main control unit to said antideflection unit and said autofocus unit; and
   a power supply unit responsive to said communication unit to selectively supply power to said antideflection unit and to said autofocus unit.

2. An optical control system, as set forth in claim 1, wherein said antideflection unit comprises:
   an antideflection control unit responsive to said communication unit to output a signal indicating a desired position that the optical system must move to in order to compensate for vibrations;
   an antideflection drive unit to move the optical system to the desired position in response to the signal from said antideflection control unit; and
   a deflection detection unit to output a signal to said antideflection control unit indicative of deflections in the optical system caused by vibrations.

3. An optical control system, as set forth in claim 1, wherein said autofocus unit comprises:
   a focus control unit responsive to said communication unit to output a signal indicating a desired position that the optical system must move to in order to obtain a desired focus state;

a focus drive unit to move the optical system to the desired position in response to the signal from said focus control unit; and a focus detection unit to output a signal to said focus control unit indicating a focus state of the optical system.

4. An optical control system, as set forth in claim 1, further comprising:

an optical system position detection unit to output a signal indicating the position of the optical system to said communication unit.

5. An optical control system, as set forth in claim 4, wherein said optical system position detection unit outputs a signal indicating the position of the optical system to said antideflection unit and to said autofocus unit.

6. An optical control system, as set forth in claim 5, wherein said antideflection unit comprises:

an antideflection control unit responsive to said communication unit to output a signal indicating a desired position that the optical system must move to in order to compensate for vibration, the antideflection control unit signal being based on the signal from said optical system position detection unit;

an antideflection drive unit to move the optical system to the desired position in response to the signal from said antideflection control unit; and a deflection detection unit to output a signal indicative of deflection in the optical system caused by vibrations.

7. An optical control system, as set forth in claim 5, wherein said autofocus unit comprises:

a focus control unit responsive to said communication unit to output a signal indicating a desired position the optical system must move to in order to obtain a desired focus state, the focus control unit signal being based on the signal from said optical system position detection unit;

a focus drive unit to move the optical system to the desired position in response to the signal from said focus control unit; and a focus detection unit to output a signal to said focus control unit indicating a focus state of the optical system.

8. An optical control system, as set forth in claim 1, wherein:

said power supply unit only supplies power to said antideflection unit when said antideflection unit is active; and said power supply unit only supplies power to said autofocus unit when said autofocus unit is active.

9. An optical control system, as set forth in claim 8, wherein said power supply unit continuously supplies power to said communication unit.

10. An optical control system, as set forth in claim 9, wherein the main control unit supplies power to said communication unit.

11. An optical control system, as set forth in claim 8, further comprising:

an optical system position detection unit to output a signal indicating the position of the optical system to said communication unit.

12. An optical control system, as set forth in claim 11, wherein said optical system position detection unit outputs a signal indicating the position of the optical system to said antideflection unit and to said autofocus unit.

13. An optical control system, as set forth in claim 12, wherein said antideflection unit comprises:

an antideflection control unit responsive to said communication unit to output a signal indicating a desired position that the optical system must move to in order to compensate for vibration, the antideflection control unit signal being based on the signal from said optical system position detection unit;

an antideflection drive unit to move the optical system to the desired position in response to the signal from said antideflection control unit; and a deflection detection unit to output a signal indicative of deflection in the optical system sensed by vibrations.

14. An optical control system, as set forth in claim 12, wherein said autofocus unit comprises:

a focus control unit responsive to said communication unit to output a signal indicating a desired position the optical system must move to in order to obtain a desired focus position, the focus control unit signal based on the signal from said optical system position detection unit;

a focus drive unit to move the optical system to the desired focus position in response to the signal from said focus control unit; and a focus detection unit to output a signal to said focus control unit indicating a focus state of the optical system.

15. A camera comprising:

a body having a main control unit; and a lens, dependent from said body, having
an optical system;
an antideflection unit to compensate for vibrations in said optical system;
an autofocus unit to adjust the focus of said optical system;
a communication unit to interface with the main control unit and to selectively transmit information to said antideflection unit and said autofocus unit; and
a power supply unit responsive to said communication unit to selectively supply power to said antideflection unit and to said autofocus unit.

16. A camera, as set forth in claim 15, wherein:

said antideflection unit includes an antideflection control unit responsive to said communication unit to output a signal indicating a first desired position that the optical system must move to in order to compensate for vibrations;

an antideflection drive unit to move the optical system to the desired position in response to the signal form said antideflection control unit; and a deflection detection unit to output a signal to said antideflection control unit indicative of deflections in the optical system caused by vibrations; and wherein said autofocus unit includes
a focus control unit responsive to said communication unit to output a signal indicating a second desired position that the optical system must move to in order to obtain a desired focus position;

a focus drive unit to move the optical system to the desired focus position in response to the signal from said focus control unit; and a focus detection unit to output a signal to said focus control unit indicating a focus state of the optical system.

17. A camera, as set forth in claim 16, further comprising:

an optical system positioning detection device which outputs a signal indicating the position of the optical system to said antideflection unit, said auto-focus unit, and said communication unit.

18. A camera, as set forth in claim 17, further comprising:
a power supply unit responsive to said communication unit to selectively supply power to said antideflection unit and to said autofocus unit.

19. A lens for a camera having a main control unit, the lens comprising:
a communication unit to interface with the main control unit;
an optical system;
an optical system position detection unit to output a signal indicating the position of the optical system;
an antideflection unit including
an antideflection control unit responsive to said communication unit to output a signal indicating a first desired position that the optical system must move to in order to compensate for vibration, the antideflection control unit signal being based on the signal from said optical system position detection unit;
an antideflection drive unit to move the optical system to the first desired position in response to the signal from said antideflection control unit; and
a deflection detection unit to output a signal indicative of deflection in the optical system sensed by vibrations;
a focus control unit including
a focus control unit responsive to said communication unit to output a signal indicating a second position that the optical system must move to in order to obtain a desired focus position, the focus control unit signal being based on the signal from said optical system position detection unit;
a focus drive unit to move the optical system to the second desired focus position in response to the signal from said focus control unit; and
a focus detection unit to output a signal to said focus control unit indicating a focus state of the optical system; and
a power supply to selectively supply power to said antideflection unit and said focus control unit.

20. An optical control system responsive to a main control unit for adjusting an optical system, the optical control system comprising:
antideflection means for compensating for vibrations in the optical system;
autofocus means for adjusting the focus of the optical system; and
communication means for interfacing with the main control unit and selectively transmitting instructions from the main control unit to said antideflection means and said autofocus means.

21. A camera comprising:
a body having a main control unit; and a lens, dependent from said body, having
an optical system;
antideflection means for compensating for vibrations in said optical system;
autofocus means for adjusting the focus of said optical system; and
communication means for interfacing with the main control unit and selectively transmitting information, from said main control unit, to said antideflection means and said autofocus means.

22. A camera comprising:

a body having a main control unit which transmits control signals to control an antideflection function and an autofocus function;
an optical system;
an antideflection unit to perform the antideflection function based on the control signals related to the antideflection function;
an autofocus unit to perform the autofocus function based on the control signals related to the autofocus function; and
a communication unit which interfaces with the main control unit, monitors the control signals and only directs the control signals related to the antideflection function to the antideflection unit and only directs the control signals related to the autofocus function only to the autofocus unit.

23. A camera, as set forth in claim 22, wherein the communication unit directs the control signals related to both the antideflection function and the autofocus function to both the antideflection unit and the autofocus unit.

24. A camera comprising:
a body having a main control unit which transmits control signals to control an antideflection function and an autofocus function;
an optical system;
antideflection means for performing an antideflection function based on the control signals related to the antideflection function;
autofocus means for performing the autofocus function based on the control signals related to the autofocus function; and
communication means for interfacing with the main control unit, monitoring the control signals and only directing the control signals related to the antideflection function only to the antideflection means and only directing the control signals related to the autofocus function only to the autofocus means.

25. A method of performing communications in a camera, the method comprising:
preparing for communication between a main control unit, an antideflection unit and an autofocus unit by transmitting an initialization signal from the main control unit to both the antideflection unit and the autofocus unit via a single communication unit;
transmitting focus control information and antideflection control information from the main control unit to the single communication unit;
only retransmitting the focus control information from the single control unit to the autofocus unit; and
only retransmitting the antideflection control information from the single control unit to the antideflection unit.

26. A method of communicating with a camera body comprising:
receiving a communication preparation signal from the camera body;
retransmitting the communication preparation signal to an autofocus unit and an antideflection unit;
receiving autofocus control signals and antideflection control signals;
only retransmitting the autofocus control signal to the autofocus control unit; and
only retransmitting the antideflection control signal to the antideflection control unit.

* * * * *